Jan. 22, 1924.

E. G. DANIELSON

VARIOCOUPLER

Filed Nov. 8, 1921

1,481,694

WITNESS
H. Sherburne

INVENTOR
Ernest G. Danielson.
BY
White Prost Evans
his ATTORNEYS

Patented Jan. 22, 1924.

1,481,694

UNITED STATES PATENT OFFICE.

ERNEST G. DANIELSON, OF SAN FRANCISCO, CALIFORNIA, ASSIGNOR TO ELMER T. CUNNINGHAM, OF SAN FRANCISCO, CALIFORNIA.

VARIOCOUPLER.

Application filed November 8, 1921. Serial No. 513,857.

*To all whom it may concern:*

Be it known that I, ERNEST G. DANIELSON, a citizen of the United States, and a resident of the city and county of San Francisco, State of California, have invented a new and useful Variocoupler, of which the following is a specification.

The invention relates to vario-couplers for varying the inductive coupling of two electric circuits, and particularly to vario-couplers in which one coil is rotated about an axis with relation to another coil to vary the angular relation of the coils.

An object of the invention is to provide a vario-coupler having a simple and sensitive adjustment over the coupling range.

Another object of the invention is to provide a vario-coupler in which the angular displacement of the movable coil about its axis is greater than the angular displacement of the movable coil with respect to the fixed coil.

The invention possesses other advantageous features, some of which, with the foregoing, will be set forth at length in the following description where I shall outline in full, that form of the invention which I have selected for illustration in the drawings accompanying and forming part of the present specification. In said drawings I have shown one embodiment of my invention, but it is to be understood that I do not limit myself to such form, since the invention, as set forth in the claims, may be embodied in a plurality of forms.

Referring to said drawings:—

Figure 1:
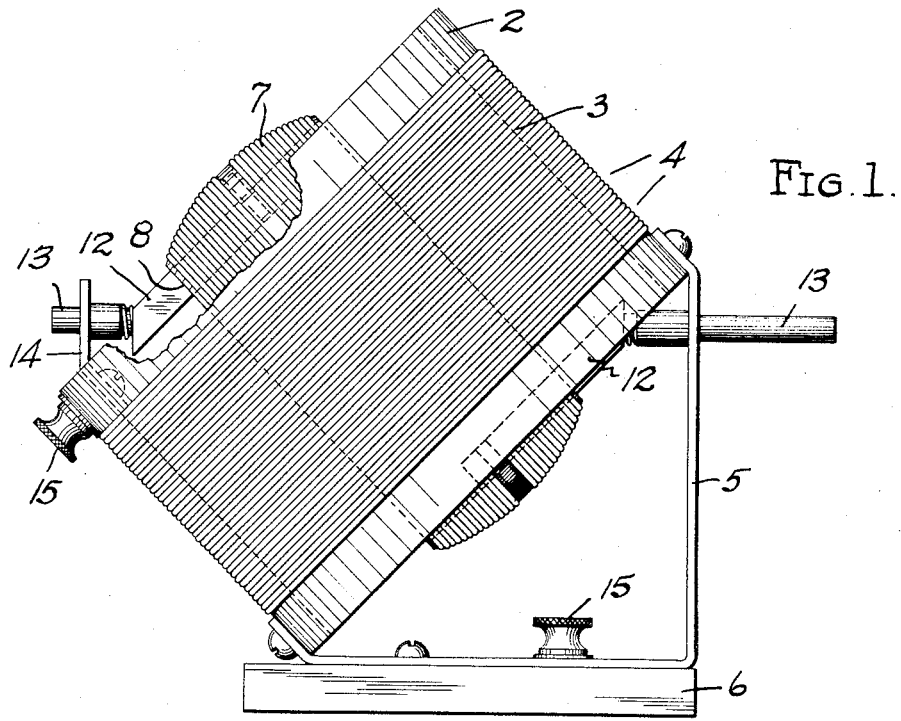
Fig. 1 is a side elevation of the variocoupler of my invention with the coils in position of minimum coupling, parts of the stationary coil being broken away.
Figure 2:
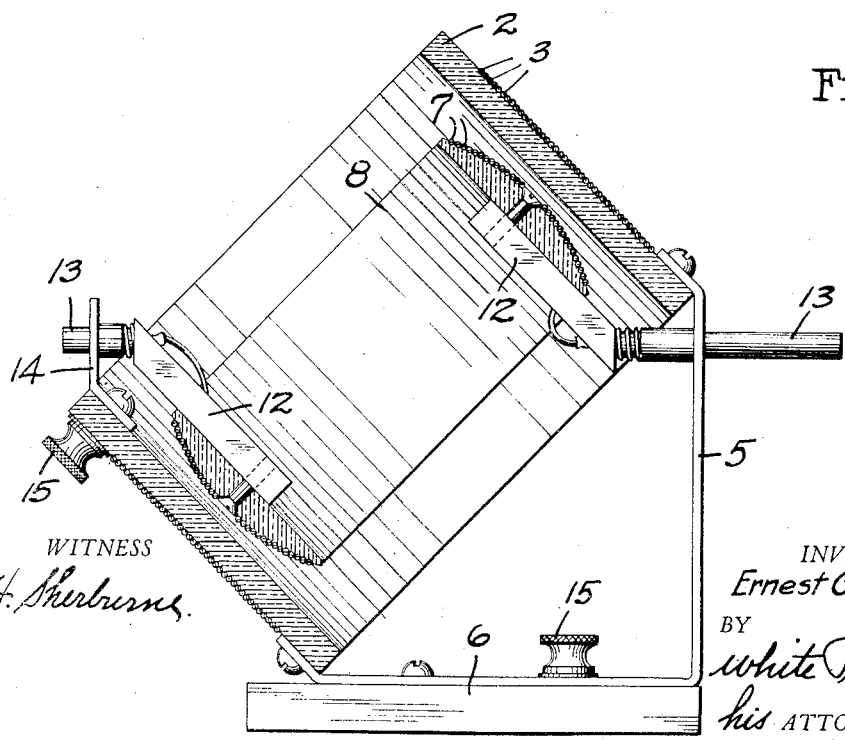
Fig. 2 is a vertical section through the vario-coupler with the coils in the position of maximum coupling.

Vario-couplers of this general type, that is, the type in which one coil is angularly adjustable with respect to the other, to vary the coupling, usually comprise two coils having coincident or parallel axes of rotation or the movable coil has been arranged on an axis of rotation perpendicular to the plane of the stationary coil. In either construction, the angular displacement of the movable coil on its axis was equal to the angular displacement of the movable coil with respect to the stationary coil. In accordance with the present invention I provide a movable coil, so arranged with respect to the stationary coil, that the angular displacement of the movable coil about its axis is greater than the angular displacement of the movable coil with relation to the plane of the stationary coil, and in the arrangement shown in the drawing, the angular displacement of the movable coil about its axis of rotation is equal to twice the angular displacement of the movable coil with respect to the plane of the stationary coil. By virtue of this construction, the shaft of the movable coil is movable through an angle of 180° to effect movement of the movable coil through an angle of 90° with respect to the plane of the stationary coil. This provides a range of 180° of angular movement from a position of maximum coupling to a position of minimum coupling, instead of 90°, as has heretofore been the rule, thus permitting finer and closer adjustment of the inductive coupling.

In accordance with my invention I provide two coils, one of which is mounted on an axis of rotation disposed at an angle of 45° with respect to the axis of the other coil. The rotatable coil is preferably disposed within the other coil, which is preferably stationary. In the present construction, the vario-coupler comprises a cylindrical frame 2 of bakelite, fiber, wood or other material, on which is formed a coil 3, which is usually the primary coil, and which is provided with a plurality of taps 4, so that the number of turns of the coil in circuit may be varied. For purposes of convenience, this coil is mounted, so that its axis is disposed at an angle of 45° to the horizontal, on a bracket 5, attached to the base 6.

The secondary winding 7 is formed on a hollow core 8 disposed within the coil 3 and is rotatable on an axis disposed at an angle of 45° to the axis of the stationary coil. Since the stationary coil is disposed at an angle of 45° to the horizontal, the axis of rotation of the movable coil is horizontal. The secondary winding is disposed at an angle of 45° to its axis of rotation, so that it is movable from a position of parallelism with the stationary coil, to a position perpendicular thereto, by a rotation of the movable coil through an angle of 180°. The movable coil is supported by metallic bars 12 having stub shafts 13, one of which is journaled in the bracket 5 and the other of which is journaled in the bracket 14 secured to the frame 2. The opposite ends of the secondary coil winding are connected to the bars 12, and binding posts 15 are provided on the brackets.

I claim:

1. In combination, a pair of coils relatively movable so as to vary the extent of coupling, means for rotatably mounting the movable coil within the stationary coil, comprising bars fastened to the inside of the movable coil at diametrically opposite points and extending beyond the coil, rotatable shafts fastened to these bars, the axis of the shafts being oblique to the axes of both coils, and a bearing for one of said shafts carried by the stationary coil.

2. In combination, a pair of coils relatively movable so as to vary the extent of coupling, a bar bent to form an angle, a support upon which one leg of the angle rests, the stationary coil being supported from the ends of the legs, and means for rotatably mounting the movable coil within the stationary coil, comprising bars fastened to the inside of the movable coil at diametrically opposite points and extending beyond the coil, rotatable shafts fastened to these bars, the axis of the shafts being oblique to the axes of both coils, and a bearing for one of said shafts carried by the stationary coil, the other shaft being rotatably mounted in the unsupported leg of the angular bar.

3. In combination, a pair of coils relatively movable so as to vary the extent of coupling, a bar bent to form an angle, one coil being stationary and supported on the bar, and means for rotatably mounting the movable coil within the stationary coil, comprising bars fastened to the inside of the movable coil at substantially diametrically opposite points and extending beyond the coil, rotatable shafts fastened to these bars, the axis of the shafts being oblique to the axes of both coils, and a bearing for one of the shafts carried by the stationary coil, the other shaft being rotatably mounted in the angular bar.

4. In combination, a pair of coils relatively movable so as to vary the extent of coupling, and means for rotatably mounting the movable coil within the stationary coil, comprising a pair of coaxial shafts carried at substantially diametrically opposite points of the movable coil, each of said shafts being fastened near one of its ends to the rotating coil structure in such a way as to extend from the rotatable coil, the axis of the shafts being oblique to the axes of both coils, and stationary bearings for the shafts.

In testimony whereof, I have hereunto set my hand.

ERNEST G. DANIELSON.